United States Patent [19]

Krämer et al.

[11] 4,315,122
[45] Feb. 9, 1982

[54] CONTACT ARRANGEMENT

[75] Inventors: Wilhelm Krämer, Sandhausen; Joachim Gräfling, Ubstadt-Weiher, both of Fed. Rep. of Germany

[73] Assignee: BBC Brown, Boveri & Company, Ltd., Baden, Switzerland

[21] Appl. No.: 98,791

[22] Filed: Nov. 30, 1979

[30] Foreign Application Priority Data

Nov. 30, 1978 [DE] Fed. Rep. of Germany ....... 2851738

[51] Int. Cl.³ .............................................. H01H 1/32
[52] U.S. Cl. .................................. 200/248; 200/162; 200/271; 200/48 KB
[58] Field of Search ............. 200/248, 254, 271, 272, 200/162, 48 KB

[56] References Cited

U.S. PATENT DOCUMENTS 2,650,284 8/1953 Volgovskoy ..................... 200/162

FOREIGN PATENT DOCUMENTS 1098142 7/1955 France ............................. 200/162
556452 10/1943 United Kingdom ............... 200/271

Primary Examiner—Willis Little
Attorney, Agent, or Firm—Burns, Doane, Swecker & Mathis

[57] ABSTRACT

The present invention concerns a contact arrangement with a first contact and a second contact. The second contact has two contact members between which the first contact is received. A contact support resiliently supports one of the first and second contacts so that the supported contact is resiliently mounted relative to the contact support means and movable relative to the other contact.

4 Claims, 3 Drawing Figures

CONTACT ARRANGEMENT

BACKGROUND AND SUMMARY OF THE PRESENT INVENTION

The present invention concerns a contact arrangement for electric power switches.

Medium voltage switch panels can be equipped with built-in switch units or with removable switch units, which switch units are usually power switches. Such a power switch is typically mounted on a carriage type switch unit and can be electrically connected, by break contacts, with the switch panel when the carriage type switch unit is pushed into the switch panel. It is important that the moveable contacts of the carriage type switch unit be able to interlock properly with the opposed contacts which are fixedly arranged at the switch panel.

The published German Patent Application No. 1,665,986 describes a contact arrangement, for a removable switch unit in a switch panel, which has a knife blade contact member and a retaining device member, said retaining device member being movable relative to the knife blade contact member. Due to the limited lateral travel of the contact sections of the contact arrangement placed in pairs opposite to each other, it becomes necessary to lead the interlocking contacts toward each other with great accuracy so that they will engage properly. The carriage type switch carrying the contact members must therefore be moved into the switch panel in a precise manner, making it necessary to use close tolerances at greater manufacturing cost.

Accordingly, it is a primary object of this invention to provide a contact arrangement with one contact member, preferably a male knife blade contact member and at least one other contact member, preferably a female member movable relative to the one member so that the two will securely interlock even with a coarsely centered alignment.

The invention solves the above-mentioned object and others in that the female contact sections are held, self-supported towards the open contact side, and are self-centering relative to the male knife blade contact member. The female contact sections are arranged between the end portions of a U-shaped support. The contact sections and the U-shaped support are connected at one of their ends with the contact support by two bolts which pass through the contact support and are arranged perpendicularly thereto. In an area bounded by the two bolts, the U-shaped support, and the contact support there is provided a spring arrangement for self-centering the female contact sections relative to the male knife blade contact.

The spring arrangement can comprise two trapezoidally-shaped leaf springs united at their narrow base sides, the leaf springs extending vertically to the contact support. The free, inwardly bent, ends of the leaf spring's legs will rest at the bolts on one side and at the U-shaped support and the contact support on the other side.

The invention is also advantageous in that if the switch gear is placed on its side greater lateral tolerances for the axial alignment of the male knife blade contact with the female contact will be acceptable. Also, height related tolerances pose no problem due to the knife blade design of the contact. The proposed contact arrangement is particularly suited for switch panels which have removable switch gear.

BRIEF DESCRIPTION OF THE DRAWINGS

Preferred embodiments of the present invention are described in the accompanying drawings wherein like members bear like reference numerals and wherein.

DETAILED DESCRIPTION OF THE PREFERRED EMBODIMENTS

Figure 1:
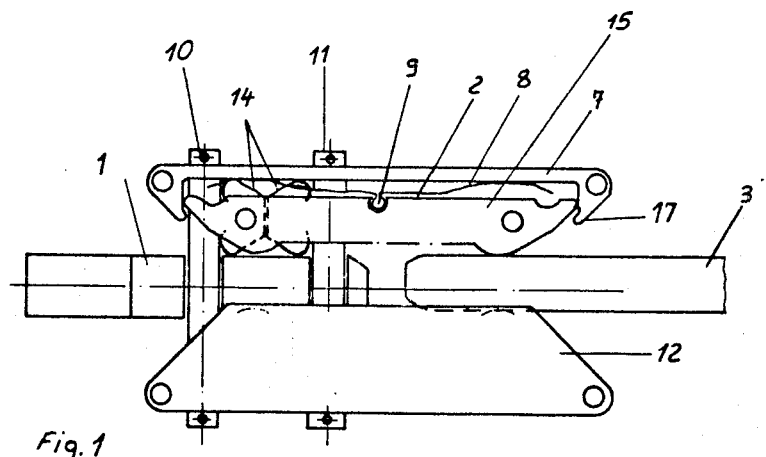
FIG. 1 is a partial longitudinal section of a contact arrangement according to the present invention.

With reference to FIG. 1, a contact support 1 carries on either side female contact sections 2 which are generally parallel to each other and are resiliently biased against each other. The upper and lower contact sections will accommodate between themselves a male knife blade contact 3. In FIG. 1, a plurality of lower contact sections is not visible because it is covered by a side plate 12. Each contact section 2 is stack-like and formed from individual parts 15 which are preferably stamped or punched during manufacture. There are spacers 4 located between each part 15, with the result that one contact section will consist of several conductive tracks 5, formed by the parts 15, to facilitate dissipation of heat caused by resistance to current flow.

Figure 2:
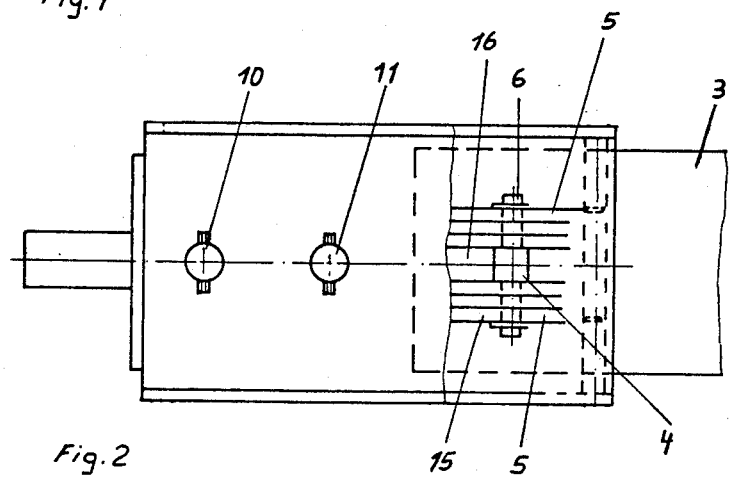
FIG. 2 is a top view with a partial cutaway of the contact arrangement according to FIG. 1.

A plurality of fastening pins 6 (one of which is shown in FIG. 2) hold together the contact sections 2. Each of the contact sections 2 is placed between the end portions of a respective U-shaped support 7, with each support's front end portion being provided with a transversely and inwardly extending projection 17 to facilitate the mounting of the contact sections 2. Between each of the contact sections 2 and the respective U-shaped support 7 is a curved leaf spring 8 which is held on the outer side of the contact section 2 and within a circular cutout 9 in the contact section. The free ends of the curved leaf spring rest on the inside of the U-shaped support 7, one end towards the front thereof and the other end alongside a pair of fastening bolts 10, 11. The fastening bolts 10, 11 are placed in tandem perpendicular to said contact support 1 so as to connect the U-shaped support 7 and the contact sections 2.

In a gap 16, formed by the inside two conductive tracks 5 of the contact sections 2, a spring arrangement 14 is located in the area bounded by the two fastening bolts 10, 11, the U-shaped support 7, and the contact support 1. This spring arrangement 14 permits lateral deflection of the two contact sections so that even a coarsely centered male knife blade contact 3 can be engaged securely by the female contact sections 2. The spring arrangement comprises two trapezoidally-shaped leaf springs 14 which are united at their narrow base sides, with the base sides extending vertically to the contact support. The free inwardly bent ends of the legs rest in an area bounded by the fastening bolts 10, 11, the U-shaped support 7 and the contact support 1. Due to this arrangement the two contact sections 2 can be deflected under spring force so that even an imprecisely centered male knife blade contact member 3 can be securely engaged between the two female contact sections 2.

The contact sections 2 are covered by side plates 12 which are fastened at the U-shaped support 7. In order to attain a low junction resistance across the contact sections 2 and the knife blade contact 3, the contact sections 2 may be provided with curved seating surfaces.

Figure 3:
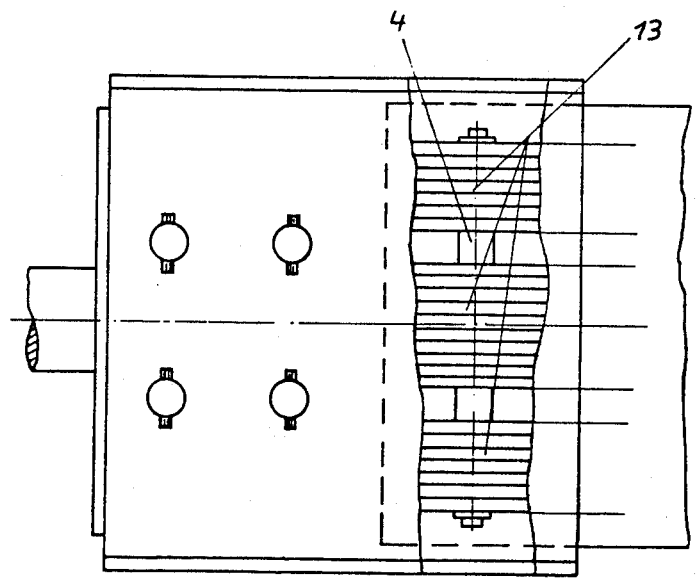
FIG. 3 is a top view with a partial cutaway of another contact arrangement according to the present invention, having larger dimensions and an increased current carrying capacity.

FIG. 3 depicts a contact arrangement of larger dimensions, and thus a greater current carrying capacity. The two contact sections are divided, by a suitable partition of the stack into three groups of conductive tracks 13. The number of fastening bolts and spring arrangements has been doubled.

The principles, preferred embodiments, and modes of the present invention have been described in the foregoing specification. The invention which is intended to be protected herein should not be construed as limited to the particular forms disclosed, since these are to be regarded as illustrative rather than restrictive. Variations and changes may be made by those skilled in the art without departing from the spirit of the present invention.

What is claimed is:

1. A contact arrangement comprising:

a first contact;

a second contact having at least two contact members with the first contact being receivable between the two contact members, said contact members each including at least two conductive track parts separated by a gap, and fastening means for holding said conductive track parts together; and contact support means for resiliently supporting said second contact so as to be both resiliently supported relative to the contact support means and movable relative to said first contact and such that said at least two contact members are both movable relative to each other and movable relative to the contact support means, said contact support means including first and second generally U-shaped supports, each of said U-shaped supports having two end portions between which one of said contact members is arranged; and bolt means for connecting both said U-shaped supports and said contact members with the contact support means.

2. A contact arrangement comprising:

a first contact;

a second contact having at least two contact members with the first contact being receivable between the two contact members; and contact support means for resiliently supporting said second contact so as to be both resiliently supported relative to the contact support means and movable relative to said first contact and such that said at least two contact members are both movable relative to each other and movable relative to the contact support means; said contact support means including first and second generally U-shaped supports, each of said U-shaped supports having two end portions between which one of said contact members is arranged; bolt means for connecting both said U-shaped supports and said contact members with the contact support means; and first spring means for resiliently centering the contact members relative to the contact support means and second spring means for resiliently centering the contact members relative to the first contact.

3. The contact arrangement according to claim 2 wherein said first spring means includes two trapezoidally-shaped leaf springs each having narrow base sides and legs, said leaf springs being united at the narrow base sides, with said narrow base sides extending to the contact support means.

4. The contact arrangement according to claim 3 wherein each of said leaf springs is located within a respective one of said gaps separating said at least two conductive track parts.

* * * * *